No. 810,184. PATENTED JAN. 16, 1906.
W. BROADBENT.
CARVED GUM FORM.
APPLICATION FILED JULY 6, 1905.
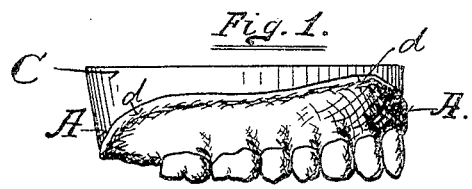
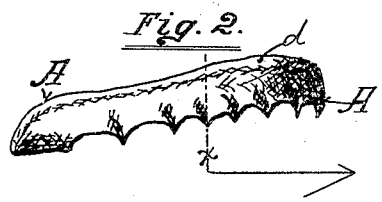
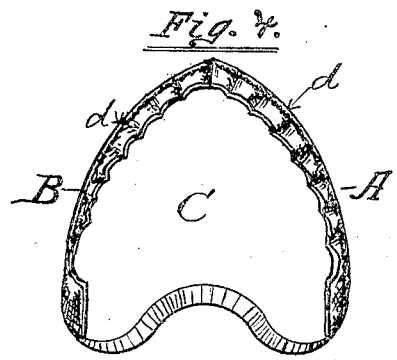
Witnesses:
Sam Raney
Nicholas T. Spenderson
Inventor:
William Broadbent
by J. M. Thomas
his Attorney.

UNITED STATES PATENT OFFICE.

WILLIAM BROADBENT, OF SALT LAKE CITY, UTAH.

CARVED GUM-FORM.

No. 810,184.  Specification of Letters Patent.  Patented Jan. 16, 1906.

Application filed July 6, 1905. Serial No. 268,546.

*To all whom it may concern:*

Be it known that I, WILLIAM BROADBENT, a citizen of the United States, residing at Salt Lake City, in the county of Salt Lake and State of Utah, have invented a new and useful Process and Device for Manufacturing Artificial Teeth, of which the following is a specification.

My invention relates to the making of plates as settings for artificial teeth and to furnish a more perfect and easily-constructed mold of the gums that holds the teeth in the plate and a suction-rim that holds the denture in the mouth.

Prior to the invention and use of this gum-form by myself the dentist after taking the impression of the inner parts of the jaw in wax or plaster runs over that impression in plaster a foundation-cast without teeth or outer gums. He then sticks to the foundation-cast the teeth that are to be indentures by using a wax base-plate conforming to the inner gum. Then he formed and carved the outer gums and suction-rims of wax. The forming of the outer gums and suction-rims required special training in that line of work and considerable time to produce that form of gums that when reproduced in vulcanized rubber would represent the form of the natural gums, and on the upper edge of the gum form a suction-rim that would hold the plate in position in the mouth, for the tongue, throat, and lips in swallowing when the suction-rim is properly formed causes a vacuum between the rim and the cheek, which is slightly pushed out.

By the use of this invention when the dentist has attached the artificial teeth to the foundation-cast, as above set out, the gum-form and suction-rim are now placed in position and attached to the teeth $a\ a\ a\ a\ a\ a\ a$ and foundation-cast C by wax, in this way presenting a more natural looking gum and a more perfectly working suction-rim $d'$ and doing in a few seconds what has heretofore taken hours and requiring no special skill. I attain these objects in the manner and by the means illustrated in the accompanying drawings, in which similar letters of reference indicate like parts.

Figure 1 is a side view of the gum-form in place over the upper parts of the teeth and attached to the foundation-cast of an upper-jaw model. Fig. 2 is a side view of the gum-form and suction-rim. Fig. 3 is a lower edge view of the same. Fig. 4 is lower view of a right and left gum form in position on a foundation-cast. Fig. 5 is a section view on line $x$ in the direction of arrow, Fig. 2.

When the foundation-cast C, of plaster, is made by casting over the wax impression of the inner parts of the jaw and gums without the teeth or outer parts of the gums, the dentist attaches to the said cast and base-plate of wax the artificial teeth to be used. Then placing the gum-forms A and B over the upper portion of the teeth, the said gum-forms A and B are attached by wax to the teeth $a\ a\ a\ a\ a$ and the foundation-cast C.

The gum-forms A and B are similar in every way, except one is right, the other is left, and for the lower jaw similar forms are used.

Having thus described my invention, I claim and desire to secure by Letters Patent—

A suction-rim shaped to fit between the teeth and cheeks of the face, carrying a carved gum-form, shaped similar to the natural gums, with the lower part cut to fit over the artifical teeth, that are attached to the foundation-cast of a model for a denture.

WILLIAM BROADBENT.

Witnesses:
 SAM RANEY,
 NICHOLAS T. HENDERSON.